United States Patent [19]
Kobori et al.

[11] 3,791,277
[45] Feb. 12, 1974

[54] SWITCHING APPARATUS FOR ELECTRIC SHUTTER MECHANISMS

[75] Inventors: Toshio Kobori; Masaru Ohba, both of Osaka, Japan

[73] Assignee: Minolta Camera Kabushiki Kaisha, Osaka-shi, Osaka-fu, Japan

[22] Filed: Mar. 8, 1973

[21] Appl. No.: 339,282

Related U.S. Application Data

[63] Continuation-in-part of Ser. No. 165,562, July 23, 1971, abandoned.

[30] Foreign Application Priority Data

July 25, 1970 Japan.............................. 45-65336
Nov. 27, 1972 Japan.............................. 47-118107

[52] U.S. Cl. ................................................. 95/42
[51] Int. Cl. ......................................... G03b 19/12
[58] Field of Search ................ 95/10 CT, 42, 53 EB

[56] References Cited
UNITED STATES PATENTS

| | | | |
|---|---|---|---|
| 3,474,715 | 10/1969 | Nakamura | 95/42 |
| 3,533,348 | 10/1970 | Yanagi et al. | 95/42 X |
| 3,623,410 | 11/1971 | Mita | 95/42 X |
| 3,641,890 | 2/1972 | Ono | 95/42 X |
| 3,695,159 | 10/1972 | Mita | 95/42 X |

Primary Examiner—Samuel S. Matthews
Assistant Examiner—Michael L. Gellner
Attorney, Agent, or Firm—Robert J. Lasker

[57] ABSTRACT

An electric shutter switching mechanism includes a first switch for selectively connecting a storage element with a light measuring circuit and a second switch for selectively connecting a timing circuit for closing the shutter with an electric power source. An operating member is movable between first and second positions which respectively represent the viewing condition and the photographing condition of the camera. The member interlocking with the operating member actuates the first switch to electrically isolate the storage element from the light measuring circuit and actuates the second switch to connect the timing circuit to the electric power source. With the operating member in the second position the interconnection between the members and the shutter releasing operation is terminated.

12 Claims, 17 Drawing Figures

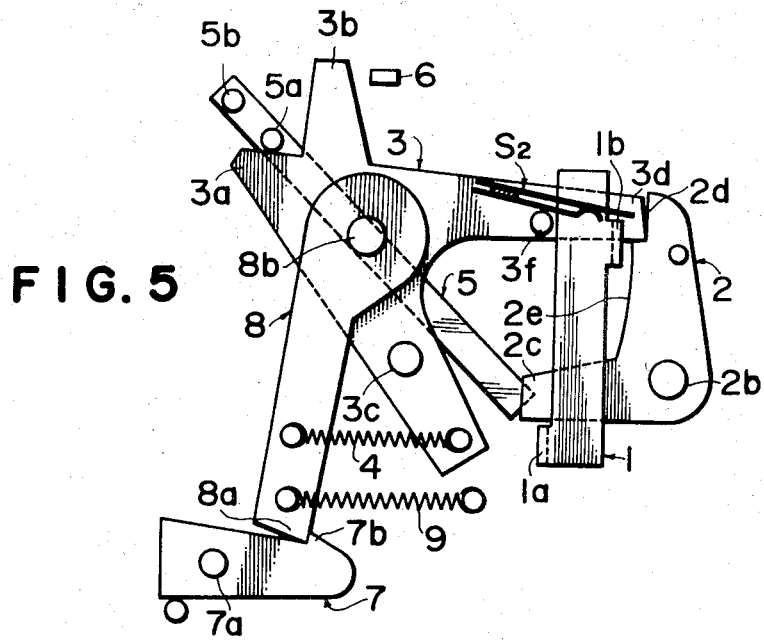
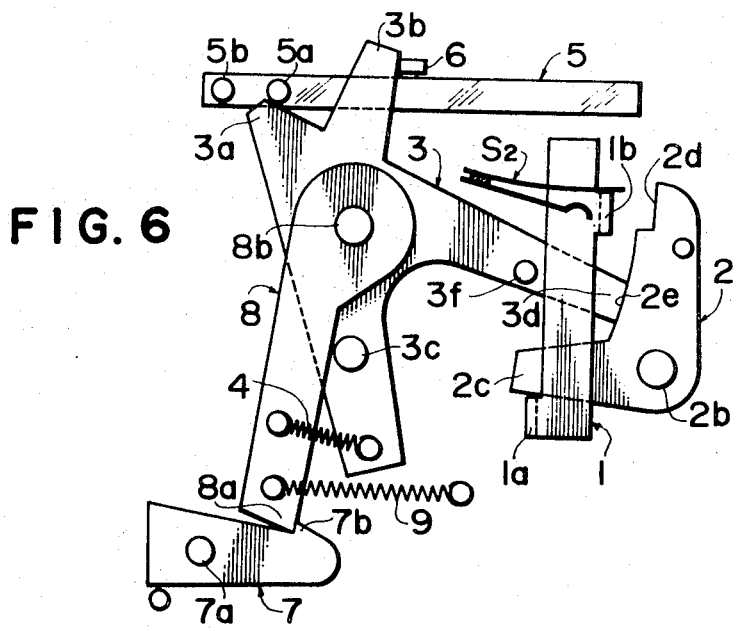

SWITCHING APPARATUS FOR ELECTRIC SHUTTER MECHANISMS

This application is a Continuation-in-Part of application Ser. No. 165,562, filed July 23, 1971, now abandoned.

BACKGROUND OF THE INVENTION

The present invention relates to photographic cameras provided with an electric shutter which automatically controls the exposure time by the photometric measurement (hereinafter referred to as "the TTL type") of light rays passing through an objective lens.

In a camera provided with an electric shutter of the TTL type which automatically controls the exposure time, it is difficult to conduct the photometric measurement during exposure of the film. Therefore, the photometric operation is carried out prior to the exposure and the light measurement is stored and the exposure time control is carried into effect on the basis of the stored signal. It is well known that an electric shutter provided with a photometric circuit, a storage circuit, and an exposure time control circuit may be used. A change-over switch is interposed between the photometric circuit and the storage circuit, and the operation of the change-over switch is carried out manually. Therefore, to obtain an accurate photometric operation, the time to operate the change-over switch must be determined and its relationship with any other exposure motion such as the motion of a mirror in the case of the single reflex camera. Consequently, the switching operation is not only troublesome, but also accompanied with various inconveniences.

OBJECT OF THE INVENTION

It is a primary object of the present invention to provide a novel apparatus which eliminates such customary defects as described above in a photographic camera provided with an electric shutter of the TTL type for automatically controlling exposure time.

It is another object of this invention to provide an apparatus in a photographic camera provided with a TTL type electric shutter for automatically controlling an exposure time, wherein a more precise photometric measurement is carried out.

Another object of this invention is to provide an improved switching apparatus interconnecting the photometric circuit and a storage circuit which is actuated by the pushing motion of the shutter release button.

It is still another object of this invention to provide an improved switching apparatus by means of which the switch between a photometric circuit and a storage circuit is automatically retained in an opened position until the shutter is allowed to begin its closing motion and for automatically closing the switch in response to the closing motion of the shutter.

And yet another object of this invention is to provide a photographic camera having an electric shutter provided with a variety of novel switching mechanisms for connecting and disconnecting a photometric circuit and a storage circuit.

SUMMARY OF THE INVENTION

The present invention comprises a construction in which a switch disposed between a photometric circuit and a storage circuit in the TTL type automatic exposure control circuit comprising the photometric circuit, the storage circuit and an exposure time control circuit, is opened by the movement of either an operating lever or a locking lever which are both interlocked with the pressing motion of a release button. Subsequently, a preset lever is turned by means of the pressing motion of the release button via a locking lever, and a mirror is actuated by means of the exposure motion, the shutter being accordingly opened and closed in relation to the exposure time control circuit.

Moreover, the present invention is characterized in that it also comprises a construction in which the switch, disposed between the photometric circuit and the storage circuit and having been opened by being interlocked with the pressing motion of the release button, is automatically kept opened during the exposure motion. That is, this is achieved during the motion of the mirror and the opening and closing motion of the shutter, on account of the movement of the preset lever, the special construction of the switch itself and a spacer interposed between the switch and the preset lever. Further, with the closing motion of the shutter, the preset lever and the locking lever are both returned to their initial positions because of the movement of an arresting lever and a charging lever. The switch is thereafter closed automatically.

The aforementioned construction is highly advantageous and usable with superior photographic techniques because with the first stage of the pressing motion of the release button the switch between the photometric circuit and the storage circuit is opened, and with the second stage of the release pressing motion the exposure motion is activated. Thereby, the amount of light rays incident upon a light receptive element is not impaired by such an affect due to the movement of the mirror that is generally seen in cameras, for example, of the single reflex type. Accordingly, the photometric value thereof obtained in a correct photometric situation is capable of being accurately stored and by slightly pushing the release button the photometric data is first stored, and thereafter by further pushing the release button at a time after approaching nearer to or departing away from an object an actual exposure is capable of being carried into effect.

Moreover, with the construction according to the present invention, if the shutter releasing motion is once started, even though the release button is thereafter freed, the switch between the photometric circuit and the storage circuit is kept opened until the shutter closing motion is terminated. Concurrently with the termination of the shutter closing motion the switch between the photometric circuit and the storage circuit is closed, thereby advantageously precluded is the necessity of the troublesome requirement that the release button must be kept pressed throughout the duration of the exposure time.

BRIEF DESCRIPTION OF THE DRAWINGS

FIG. 5 is a side elevation showing another embodiment including a mechanism for operating a switch disposed between a photometric circuit and a storage circuit;

FIG. 6 is a side elevation showing a different operating position for the embodiment shown in FIG. 5;

DESCRIPTION OF THE PREFERRED EMBODIMENTS

Figure 1:
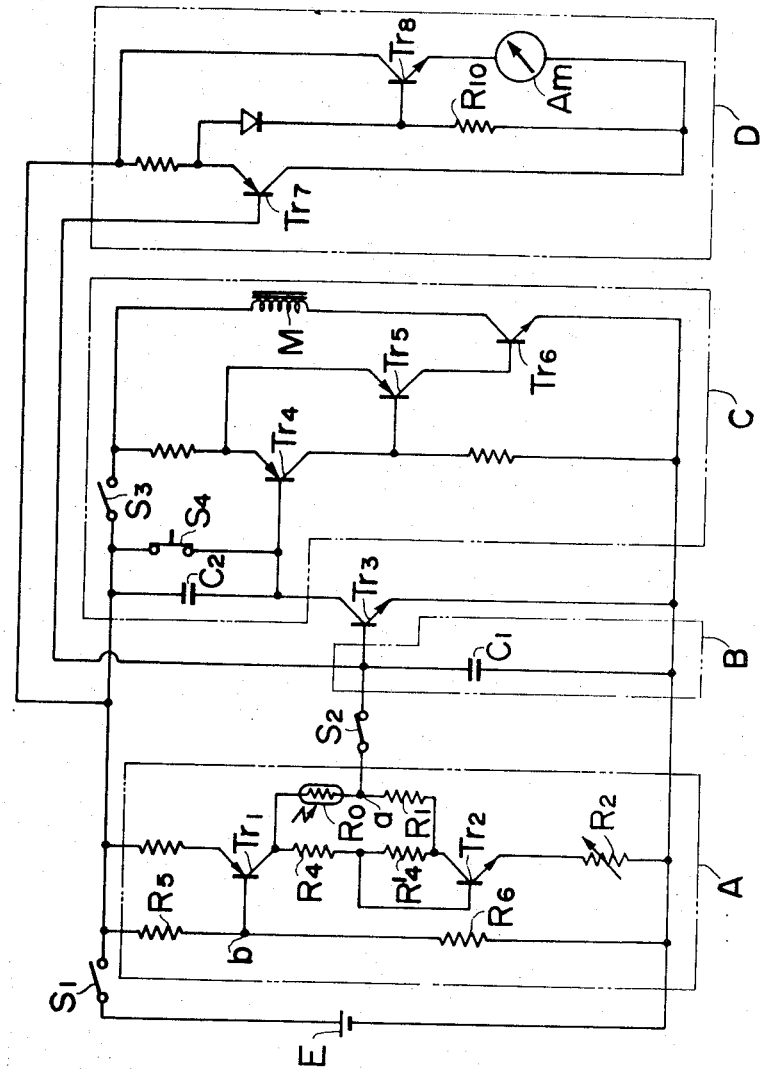
FIG. 1 is a circuit diagram showing an embodiment of an electrical circuit in accordance with the present invention.

FIG. 1 is a circuit diagram showing an electric shutter, wherein respectively denoted are photometric circuit A, storage circuit B, exposure time control C, and meter circuit D which indicates the exposure time. Power source E is connected through power source switch $S_1$ to both resistors $R_5$ and $R_6$ to provide proper voltages in photometric circuit A. Junction $b$ between divider resistors $R_5$ and $R_6$ is connected to the base of first stage compensating transistor $T_{r1}$. Connected to the collector of transistor $T_{r1}$ are series connected photoconductive element $R_o$ and comparison resistor $R_1$, and series connected resistors $R_4$ and $R'_4$. The series connected photoconductive element $R_o$ and resistor $R_1$ and resistors $R_4$ and $R'_4$ are in parallel to each other and are connected to the collector of second compensating transistor $T_{r2}$. Resistor $R'_4$ is interposed between the base and the collector of transistor $T_{r2}$ of which the emitter is connected to variable resistor $R_2$ for representing the film sensitivity and the aperture stop value. The photometric output due to the photoconductive element $R_o$ is obtained as a voltage at junction $a$ between photoconductive element $R_o$ and comparison resistor $R_1$. That voltage being applied via switch $S_2$ to capacitor $C_1$ in memory circuit B.

In photometric circuit A, the respective resistance values of photoconductive element $R_o$ and comparison resistor $R_1$ are much larger than those of resistors $R_4$ and $R'_4$. Consequently, almost all of the collector current of first compensating transistor $T_{r1}$ flows through resistors $R_4$ and $R'_4$. Additionally, the collector current is of a constant value, accordingly, a voltage of a definite value is applied to the series connected photoconductive element $R_o$ and resistor $R_1$.

As described above, switch $S_2$ is interposed between photometric circuit A and memory circuit B, and this invention is characterized in the timing of the switching of switch $S_2$ which is switched on and/or off in relation to the pressing motion of the release button as further described hereinafter.

Capacitor $C_1$ is charged to the voltage of junction $a$ which is the photometric result to be stored. The voltage of capacitor $C_1$ is applied between the base and the emitter of transistor $T_{r3}$. Connected to the collector of transistor $T_{r3}$ are delay capacitor $C_2$ in the exposure time control circuit C and timing switch $S_4$ which is usually closed. The junction therebetween is wired to the base of transistor $T_{r4}$ of a switching circuit. Electromagnet M for controlling the closing motion of the shutter is interposed between the collector of transistor $T_{r6}$ via another transistor $T_{r5}$ and the switching circuit. Main switch $S_3$ of the exposure time control circuit is arranged between the switching circuit and power source E. Timing switch $S_4$, which is normally closed, and main switch $S_3$ are both controlled by means of a member which is interlocked with the motion of the release button.

The output at junction $a$ between photometric element $R_o$ and comparison resistor $R_1$ is applied to the base of amplifier $T_{r7}$ in meter circuit D which indicates the exposure time. The output of amplifier transistor $T_{r7}$ is further amplified by another amplifier transistor $T_{r8}$ of which the output is wired to ammeter A$m$.

In the circuit constructed as described above, when power source switch $S_1$ is closed, indicated on ammeter A$m$ is the shutter speed which corresponds to the potential at junction $a$, and which is responsive to the aperture stop value and the film sensitivity having been respectively set therein. Also, memory capacitor $C_1$ is connected to junction $a$ so that the logarithmically compressed voltage which is proportional to the logarithmic value of the brightness of an object is stored by capacitor $C_1$.

Thereupon, switch $S_2$ is first opened by being interlocked with the shutter releasing operation, photometric circuit A and storage circuit B are thereby isolated from each other. Main switch $S_3$ is next closed in compliance with a motion interlocked to the subsequent releasing operation. Timing switch $S_4$ is opened simultaneously with the starting time of the shutter opening motion so that the charging of delay capacitor $C_2$ is thereby started, and when its charging voltage reaches a definite value, the switching circuit is reversed so as to actuate electromagnet M, the shutter closing motion being accordingly carried into effect.

Figure 2:
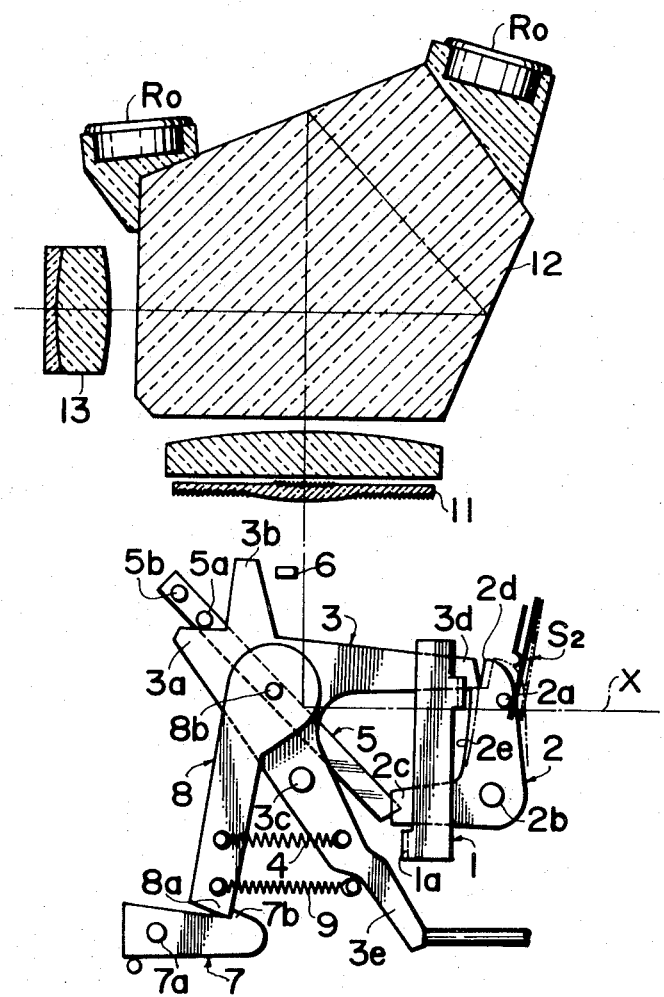
FIG. 2 is a side elevation showing an embodiment including the mechanism for operating a switch disposed between a photometric circuit and a storage circuit.

FIG. 2 illustrates an embodiment of the mechanical part of a camera indicating a mechanism for activating an electric shutter thereof, wherein, a photographic lens not shown in the drawing is located at the right side of optical axis X. The light rays transmitted through the photographic lens is reflected by mirror 5 and reaches finder eye piece 13 via pentaprism 12. Two photoconductive elements $R_o$ shown in FIG. 1 are mounted on pentaprism 12, and the average brightness of an object image on focussing screen 11 is photometrically measured by means of photoconductive elements $R_o$.

Numeral 1 denotes an operating lever which is operated by being interlocked with a release button not shown in the drawing, and operating lever 1 moves upward in response to the pressing motion of the release button.

Locking lever 2 is counterclockwise biased about its pivot 2b due to a spring not shown, an arm 2c thereof is so disposed as to be engageable with projection 1a at the lowest end of operating lever 1, locking portion 2d erected at the other end thereof locks first arm 3d of preset lever 3. Protruding pin 2a is also formed on locking lever 2, and when the release button has not yet been pressed down as shown by the situation in FIG. 2, pin 2a is located at the position where switch $S_2$ disposed between photometric circuit A and storage circuit B has been thereby closed as shown in FIG. 1.

Preset lever 3 is biased to spring 4 so as to be turned clockwise, and spring 4 is bridged between second arm 3e and charging lever 8.

Preset lever 3 is further provided with third arm 3a which moves mirror 5 when preset lever 3 is turned clockwise, and with fourth lever 3b which pushes shutter release member 6 when it is in the position where mirror 5 has been moved. Numeral 7 denotes an arresting lever which is turned clockwise about pivot 7a when the shutter is closed. Arresting pawl 7b of arresting lever 7 is engaged with end portion 8a of charging lever 8 so as to check the counterclockwise turning of charging lever 8 by spring 9 which is bridged between charge lever 8 and the camera body.

In the construction of FIG. 2 as described above, when the release button is pressed down, operating lever 1 is displaced upward. Arm 2c of locking lever 2 is thereby pulled up by projection 1a at the lowest end of operating lever 1, locking lever 2 being accordingly turned clockwise. On account of the turning of locking lever 2, switch $S_2$ which has been kept closed by pin 2a of locking lever 2 is first opened, and after it is completely opened, the engagement between locking portion 2d and first arm 3d is disengaged. Consequently, preset lever 3 is turned clockwise due to spring 4 so that its third arm 3a provided thereon for turning mirror 5 pushes up pin 5a which is fixed to one side of mirror 5, the mirror being thereby rapidly moved upward so as to be turned about its pivot 5b. Since preset lever 3 continues to rotate clockwise even after mirror 5 has been moved, shutter release member 6 is pushed by fourth arm 3b so that the shutter starts its opening motion.

Figure 3:
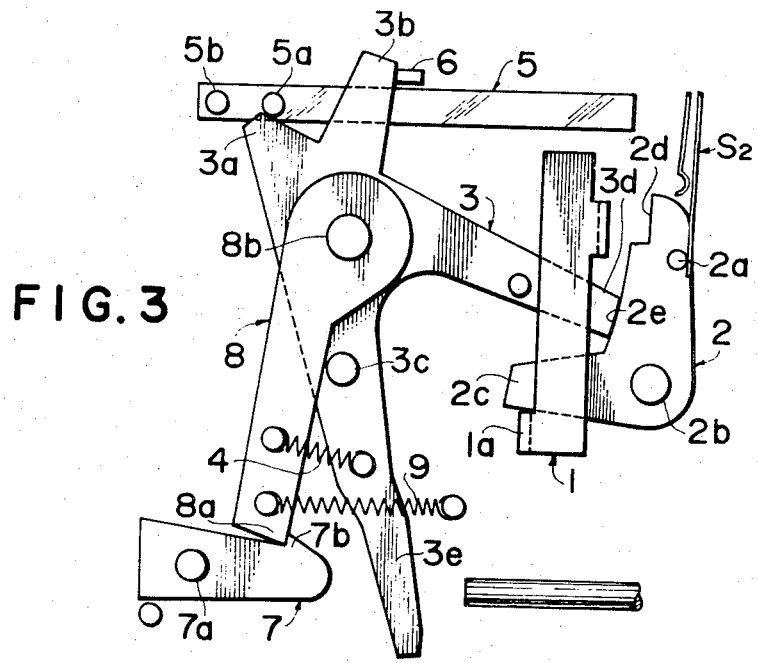
FIG. 3 and FIG. 4 are side elevations respectively showing different operating positions for the embodiment shown in FIG. 2.

Concurrently with the starting of the shutter opening motion, main switch $S_3$ shown in FIG. 1 is closed and timing switch $S_4$ similarly shown in FIG. 1 is opened. The situation at this moment is shown in FIG. 3, and as is clearly apparent, the extreme end of first arm 3d of preset lever 3 which has been turned clockwise comes into contact with side face 2e of locking lever 2. Thereby locking lever 2 has been restrained at the position where switch $S_2$ has been kept opened. This situation suggests that, if an exposure is once started by fully pressing down the release button, even though the release button is thereafter left free so as to have operating lever 1 returned downwardly while the exposure is still in progress, switch $S_2$ will be restrained by locking lever 2 so as to continuously remain in its opened position.

Figure 4:
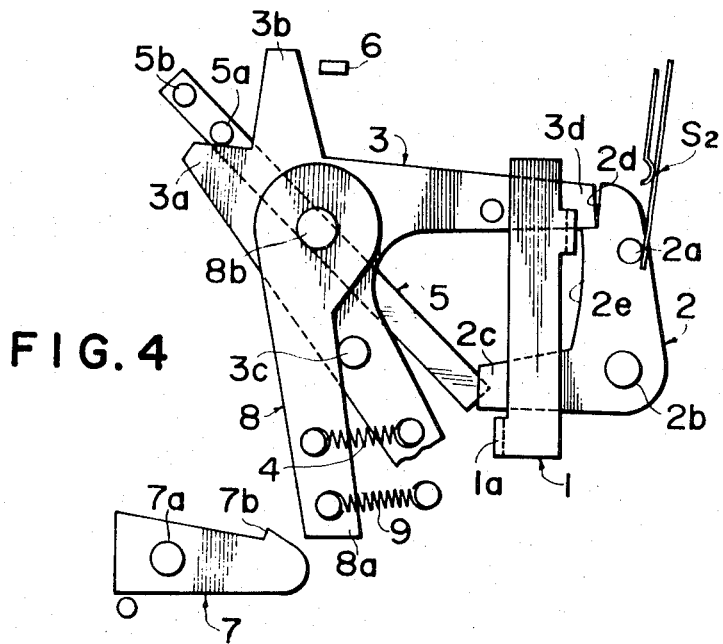

When the shutter is closed after a definite time due to the operation of exposure time control circuit C shown in FIG. 1, arresting lever 7 is turned clockwise about its pivot 7a by being interlocked with a mechanism not shown in this drawing. Accordingly, cocking lever 8 is turned counterclockwise about spindle 8b by the bias of spring 9. The rotated cocking lever 8 comes into contact with projecting pin 3c erected on second arm 3e of preset lever 3 and pushes projecting pin 3c owing to the tractive force of spring 4. Thereby preset lever 3 is returned as shown in FIG. 4 to its initial location shown in FIG. 2. Concurrently therewith, mirror 5 and locking lever 2 are also returned to their respective initial locations and switch $S_2$ is accordingly closed.

When the shutter is cocked, cocking lever 8 is turned clockwise until it comes into engagement with arresting pawl 7b; thereby both springs 9 and 4 are tensioned to restore the initial situation shown in FIG. 2.

FIG. 5 shows another embodiment of the mechanical part of a camera for actuating an electric shutter thereof, and FIG. 6 shows a different operating position therein, wherein the location at which switch $S_2$ is actuated is different from that of the embodiment shown in FIG. 2.

That is, operating lever 1 is provided on its upper portion with protrusion 1b for opening switch $S_2$, and preset lever 3 is provided on its first arm 3d with pin 3f for pushing up lower contact of switch $S_2$.

In the construction as described above, when operating lever 1 is moved upward, similar to the case of FIG. 2, by being interlocked with the pressing down motion of the release button, an upper contact of switch $S_2$ is first pushed up by projection 1b of operating lever 1, so that switch $S_2$ is opened. Because of the subsequent upward movement of operating lever 1, the engagement between locking lever 2 and preset lever 3 is disengaged by protruded portion 1a at the lowest end thereof. Thereby mirror 5 is quickly moved similar to the first embodiment. In this case, because of the clockwise turning of first arm 3d of preset lever 3, pin 3f is retracted from the lower contact which has an inherent tendency to depart from the upper contact of switch $S_2$. Accordingly, the lower contact of switch $S_2$ is completely released and thereby capable of naturally bending downward so as to be spaced apart from the upper contact piece to such an extent that, even if the upper contact moves down by being released due to projection 1b of operating lever 1, switch $S_2$ is capable of being accordingly held in its opened condition.

The returning operation is similar to that of the first embodiment, wherein, when the shutter is closed, preset lever 3 is returned from the position in FIG. 6 to the position in FIG. 5, and when mirror 5 is also returned to its initial location, switch $S_2$ is thereby closed.

Figure 7:
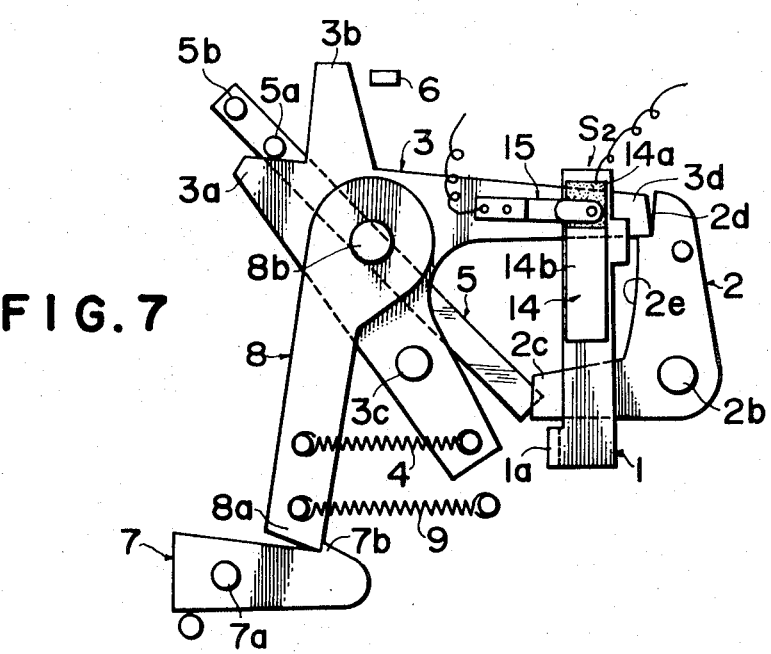
FIG. 7 is a side elevation showing still another embodiment including a mechanism for operating a switch disposed between a photometric circuit and a storage circuit.
Figure 8:
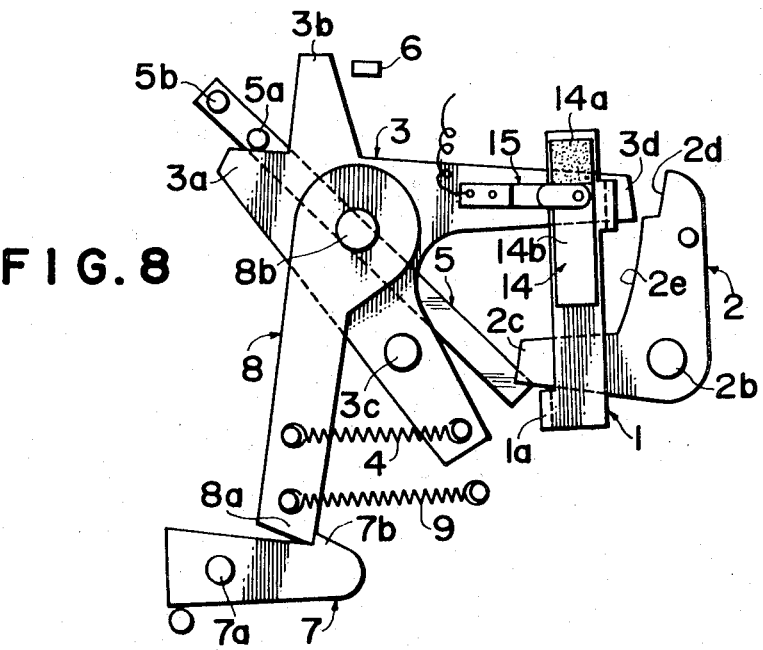
FIG. 8 and FIG. 9 are side elevations respectively showing different operating positions for the embodiment shown in FIG. 7.
Figure 9:
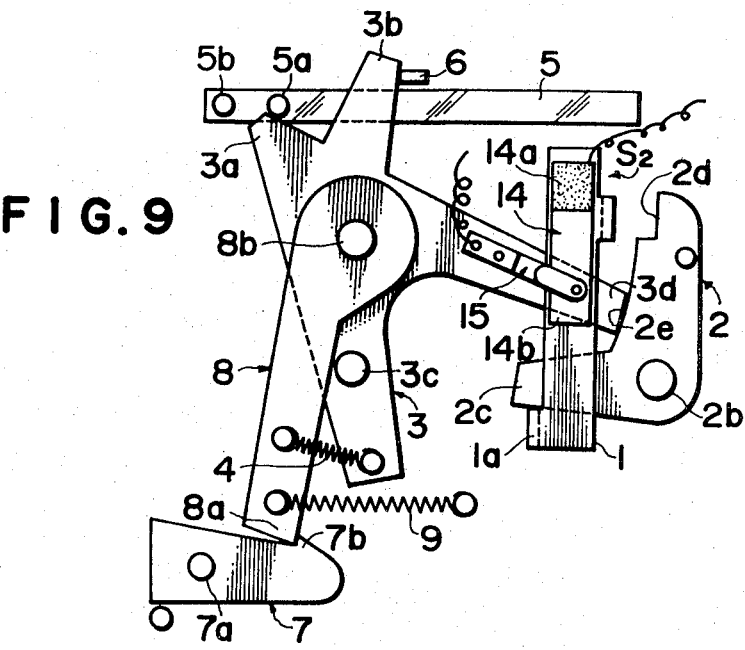

FIG. 7 shows the third embodiment of the mechanical part of a camera for activating the electric shutter thereof, and FIG. 8 and FIG. 9 show respectively different operating positions thereof. The construction of switch $S_2$ of this embodiment is also different from those of the first and the second embodiments described hereinabove.

Switch $S_2$ consists of slide conatact 14a which is fixed to operating lever 1 and brush 15 which is fixed to first arm 3d of preset lever 3. When the release button is pressed down, in compliance with the upward movement of operating lever 1, locking lever 2 is rotated clockwise, resulting in the disengagement of locking lever 2 from first arm 3d of preset lever 3. Consequently, first arm 3d is slightly lowered, so that brush 15 is, before mirror 5 is moved up, passed across the lower edge of slide contact 14a, switch $S_2$ is thereby opened. (This situation is shown in FIG. 8). In the situation shown in FIG. 9 in which mirror 5 has been already moved up, brush 15 is turned clockwise in company with preset lever 3 so as to be spaced far apart from the lower edge of slide contact 14a to such an extent that even if the release button is let free so that operating lever 1 is returned to its initial position, so long as the shutter is not closed and thereby preset lever 3 and mirror 5 are both returned to their respective initial positions, switch $S_2$ is never closed. 14b denotes an insulating material adhered to operating lever 1.

Figure 10:
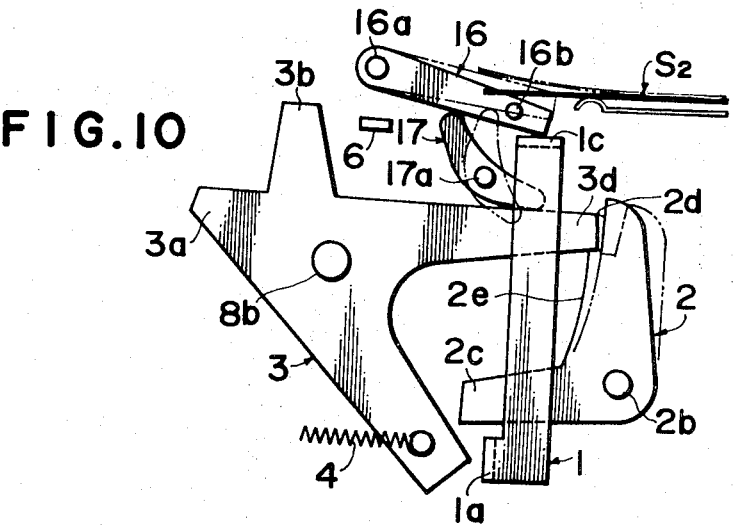
FIG. 10 is a side elevation showing yet another embodiment including a mechanism for operating a switch disposed between a photometric circuit and a storage circuit.

FIG. 10 shows the fourth embodiment of the mechanism for controlling switch $S_2$ between the photometric circuit and the storage circuit in the electric shutter. In this embodiment, switch opening lever 16 is interposed between switch $S_2$ and operating lever 1, and a spacer 17 is disposed between switch opening lever 16 and first arm 3d of preset lever 3. Accordingly, because of the pressing down motion of the release button, operating lever 1 is moved upward, the right end of switch opening lever 16 is thereby pushed up by upper end 1c of operating lever 1, so that switch opening lever 16 is turned counterclockwise about its pivot 16a. Projecting pin 16b provided on switch opening lever 16 acts on switch $S_2$, and switch $S_2$ is thereby opened.

Because of the subsequent upward motion of operating lever 1, first arm 3d of preset lever 3 is disengaged from locking lever 2 as aforementioned, preset lever 3 is thereby turned clockwise so that the mirror not shown herein is quickly moved up similarly to the embodiments described hereinbefore. Concurrently, spacer 17 is turned clockwise about its axis 17a by means of any suitable biasing force such as a spring or the like, until it is located at the position shown by a dotted line. By virtue of spacer 17 located between first arm 3d of preset lever 3 and switch opening lever 16, even though the operating lever has been returned to its initial location, switch $S_2$ is capable of being held in its opened condition.

And switch $S_2$ is closed when the shutter is closed and thereby preset lever 3 is returned to its initial location similar to the embodiments described hereinabove.

In the embodiments previously described, main switch $S_3$ is controlled in association with the operation of the release button, while the operation of storage switch $S_2$ is controlled by actuating lever 1 or lock lever 2. In such embodiments, if the release button is maintained in the downwardly pressed position after the termination of exposure, main switch $S_3$ is maintained in the closed position, whereby exposure time control circuit C remains in the operative condition, which results in the unnecessary consumption of the power source dry cells.

In contradistinction thereto, the construction of the embodiment as shown in FIGS. 11 through 17 is such that a switch lever is actuated by the release operation and maintained in the operative condition from the commencement of exposure until the termination thereof. Upon the termination of exposure, the switch lever is released. The switch lever, only when in the operative situation, opens storage switch $S_2$ to close main switch $S_3$. By controlling the operation of main switch $S_3$ by means of the switch lever, the unnecessary flow of current to exposure control circuit C is prevented, and the actuation of storage switch $S_2$ is ensured to a greater extent.

Figure 14:
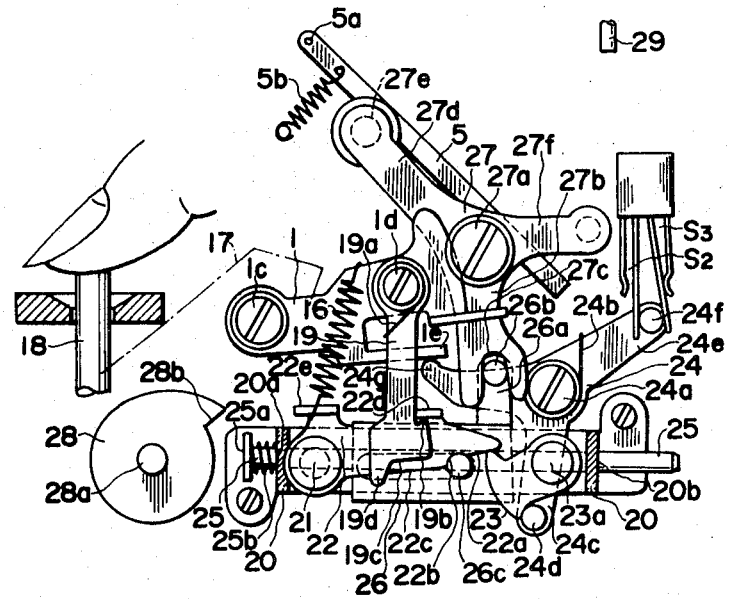
FIG. 14 shows the position of the elements of FIG. 11 wherein the shutter button is shown at an initial first stroke.
Figure 15:
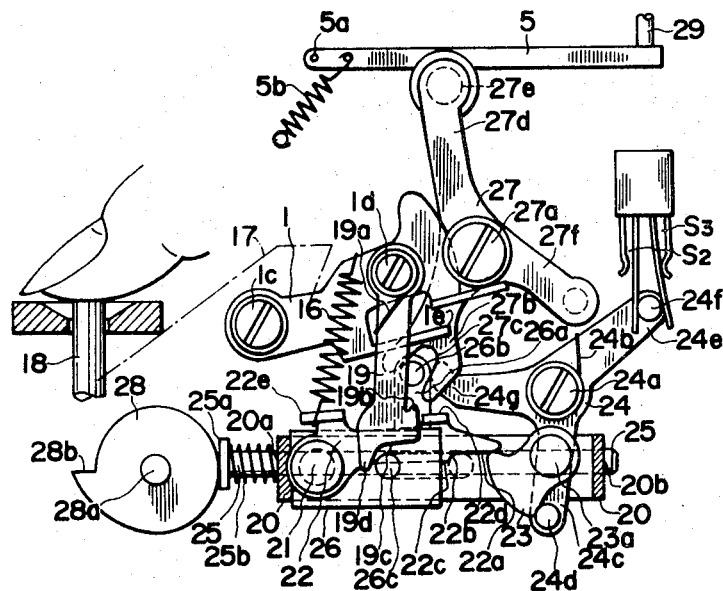
FIG. 15 shows the position of the elements of FIG. 11 wherein the shutter button is shown at its second stroke.

Throughout FIGS. 11 to 17, actuating lever 1 is journaled by axle 1c and is urged in the clockwise direction by spring 16. Actuating lever 1 is interconnected, by link member 17, with release button 18, so that when release button 18 is pushed downwardly, actuating lever 1 is rotated in the anti-clockwise direction against the force of the spring 16 to positions as shown in FIGS. 14 and 15. Link lever 19 is journaled by axle 1d on actuating lever 1 and has a bias to be rotated in the anti-clockwise direction by feeble spring 19a. Link lever 19 is provided with a projection 19b facing axle 1d and end face 19c formed with release projection 19d extending in a direction opposite to projection 19b.

Figure 12:
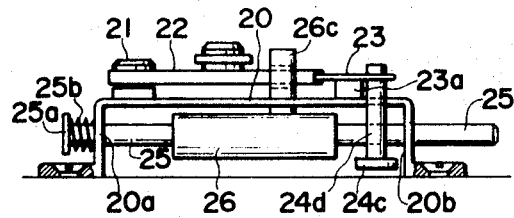
FIG. 12 is a bottom view of a body bracket portion of the embodiment of FIG. 11.
Figure 13:
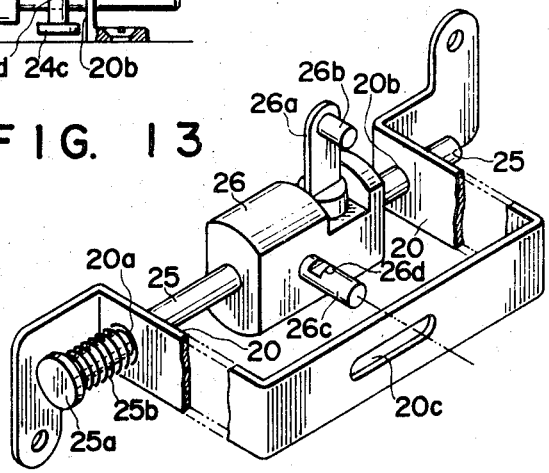
FIG. 13 is a perspective view of the body bracket of FIG. 12.

Formed on the camera body is body bracket 20, on which control lever 22 is journaled by axle 21, as best seen in FIG. 12. Control lever 22 has arm 22e connected with the other end of spring 16, whereby control lever 22 is urged in the clockwise direction. Control lever 22 has a portion consisting of bottom apex end 22a, engaging stepped portion 22b and bottom base end 22c and is formed with bent projection 22d engaging with or disengaging from projection 19b.

Figure 11:
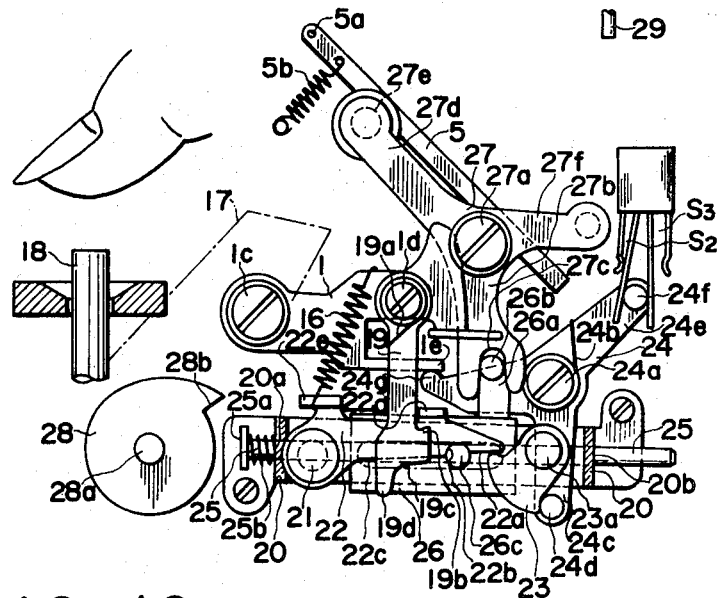
FIG. 11 is a side elevational view of an operating component with the shutter cocked.

Further, detention lever 23 is journaled by axle 23a on bracket 20 and engages pin 24d attached to first arm 24c of switch lever 24, which is rotatably journaled by axle 24a on the camera body and rotated in the clockwise direction by spring 24b. Switch lever 24 has second arm 24e provided with pin 24f. Pin 24f is engageable with either of the movable contacts of storage switch $S_2$ or main switch $S_3$. When switch lever 24 is positioned for rotation in the anti-clockwise direction against the force of spring 24b, as shown in FIG. 11, pin 24f closes storage switch $S_2$ while maintaining main switch $S_3$ in the opened position. And as soon as release button 18 is pressed downwardly, switch lever 24 is rotated in the clockwise direction by the action of spring 24b at the initial first stroke of the release button by a mechanism to be described later. Thus, pin 24f releases storage switch $S_2$ while closing main switch $S_3$ as seen in FIG. 14. Third arm 24g of switch lever 24, when actuating lever 1 is in the position for rotation in the clockwise direction as shown in FIG. 11, engages engaging arm 1e of the actuating lever, hence switch lever 24 rotates in the anti-clockwise direction against the force of spring 24b.

Formed at both sides of body bracket 20 are bearing holes 20a and 20b receiving therein lock lever 25. Lock lever 25 is urged leftwardly by biased spring 25b connected between plate 25a rigid with the left end of lever 25 and bracket 20a. Block 26 is rigidly attached to lock lever 25 so as to be moved therewith and has upwardly extending arm 26a provided with actuating pin 26b and rod 26c projecting frontwardly as seen in FIG. 11 and slot 26d extending at a right angle with respect to the axis of rod 26c. Slot 26d receives therein bottom edges 22a and 22c of the control lever in a manner of allowing a sliding motion of the bottom edges. Further, rod 26c extends forwardly to slidingly fit its forward end in aperture 20c formed on a front wall of bracket 20.

Mirror lever 27 having first arm 27b provided with forked portion 27c receiving therein actuating pin 26b is rotatably journaled by axle 27a on the camera body. Second arm 27a of mirror lever 27 has pin 27e which engages movable mirror 5 rotatably journaled by axle 5a on the camera body and having a tendency to be rotated in the clockwise direction by spring 5b. Third arm 27f thereof is projected so as to actuate a diaphragm mechanism (not shown).

A shutter closing member, for example, cam plate 28 mounted rigidly with axle 28a rotates after the completion of travel of a focal plane shutter and is engageable with end plate 25a of lock lever 25. 29 is a shutter release member operated by movable mirror 5.

The device having a construction as described above operates as follows. In the position as shwon in FIG. 11 where the shutter has been cocked, lock lever 25 is shown in the rightwardly moved position with spring 25b compressed, wherein pin 26c is locked by engagement with stepped portion 22b of control lever 22. Switch lever 24, of which third arm 24g is in engagement with arm 1e of actuating lever 1 which has been rotated in the clockwise direction by spring 16, takes a position for rotation in the anti-clockwise direction against the force of spring 24b. Pin 24f of second arm 24e closes storage switch $S_2$ while maintaining main switch $S_3$ in the opened position. Bottom apex end 22a of control lever 22, which has been rotated in the clockwise direction, urges pin 24d of first arm 24c of switch lever 24 in the clockwise direction by way of detention lever 23, thereby arresting switch lever 24 at the position for rotation in the anticlockwise direction.

As the device is maintained in the position described, release button 18 is pressed downwardly as shown in FIG. 14. Actuating lever 1, at the initial first stroke of the release button, is caused to rotate by link member 17 in tne anti-clockwise direction by a given angle, whereupon engaging arm 1e thereof becomes disengaged from third arm 24g of switch lever 24. At this time, control lever 22 in position for clockwise directional rotation still acts on switch lever 24 by detention lever 23 so as to control the clockwise rotation of lever 24. With the upward movement of link lever 19 caused by the anti-clockwise directional rotation of actuating lever 1, projection 19b thereof is brought into engagement with projection 22d of control lever 22, to thereby cause lever 22 to rotate in the anti-clockwise direction against the force of spring 16. Consequently, detention lever 23 is permitted to rotate in the clockwise direction and switch lever 24 is also caused to rotate in the clockwise direction by spring 24b. Thus, pin 24f becomes disengaged from storage switch $S_2$ to thereby open it, while in turn the pin closes main switch $S_3$. Because of that movement, the output voltage in the light measuring circuit, just before storage switch $S_2$ is opened, will be stored in storage capacitor C1 and exposure time control circuit C is rendered operative.

As for lock lever 25 at this stage, the engagement of stopped portion 22b with slot 26 is still maintained; hence the leftward sliding movement of lock lever 25 by spring 25b is not yet caused.

At the subsequent second stroke where release button 18 is further pressed downwardly, the rotation of actuating lever 1 in the anti-clockwise direction causes control lever 22 to rotate in the anti-clockwise direction by link lever 19. Thereby, stepped portion 22b of the control lever becomes disengaged from slot 26d, thereby causing lock lever 25 to move leftwardly together with block 26, by the action of spring 25b. Thus, actuating pin 26b in engagement with forked portion 27c rotates mirror lever 27 in the clockwise direction so that pin 27e causes movable mirror 5 to rotate, against the force of spring 5b, in the anti-clockwise direction from the viewing position to the photographing position. Third arm 27f adjusts the diaphragm to a given aperture setting. Mirror 5, by rotation of the photographing position, becomes engaged with shutter release member 29 to actuate it, thereby initiating the exposure, while trigger switch $S_4$ is released to effect the charging of capacitor $C_2$. When pin 26c reaches the left side end of aperture 20c and is brought into abutment with release projection 19d link lever 19 is caused to rotate in the clockwise direction against the force of spring 19a to thereby disengage engaging projection 19b from projection 22d of control lever 22. This causes the rotation of control lever 22 in the clockwise direction by the action of spring 16, and the clockwise directional rotation of control lever 22 is stopped when bottom base end 22c engages in slot 26d. Because of this engagement, the operation of bottom apex end 22a is controlled, hence the rotation of switch lever 24 in the anti-clockwise direction by detention lever 23 is not yet initiated. Accordingly, storage switch $S_2$ is maintained in the opened position while main switch $S_3$ is maintained closed. At this stage, end face 19c rests on pin 26c, hence the return motion of actuating lever 1 in the clockwise direction is not yet caused.

Figure 16:
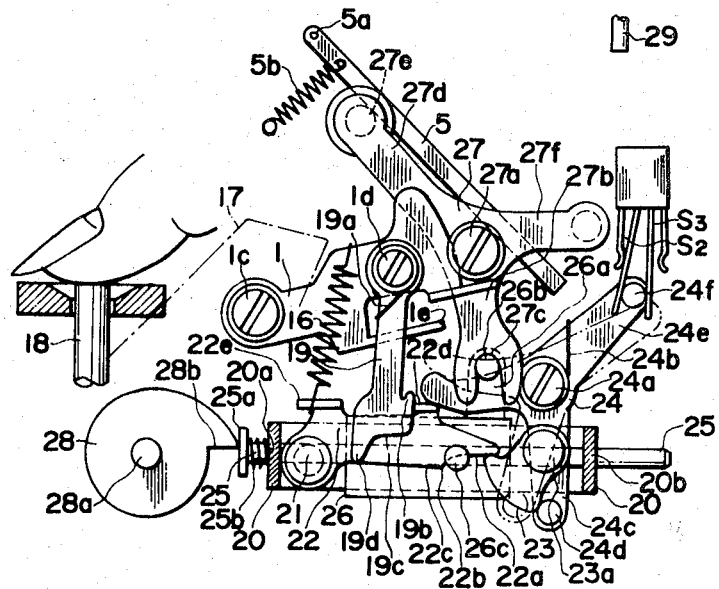
FIG. 16 shows the position of the elements of FIG. 11 wherein the shutter release button is maintained in the downwardly pressed position after the termination of exposure.

When the voltage of capacitor $C_2$ of the electric control circuit C reaches a given level, the switch circuit is cut off to thereby render electromagnet Mg nonconductive, and the shutter charging member is actuated. Upon the termination of exposure, cam plate 28 is rotated to a position where projected face 28b thereof urges end plate 25a rightwardly against the force of spring 25b, as shown in FIG. 16, whereby pin 26b causes mirror lever 27 to rotate in the anti-clockwise direction. Thus, movable mirror 5 is allowed to rotate in the clockwise direction by spring 5b into the viewing position. During this movement, bottom apex end 22a is caused to engage in slot 26d by stepped portion 22b. This causes, by means of detention lever 23, the rotation of switch lever 24 in the anti-clockwise direction, and consequently pin 24f releases main switch $S_3$ while in turn closing storage switch $S_2$.

Accordingly, in case the object to be photographed is bright, hence the time of exposure is short, and if release button 18 is maintained in the downwardly pressed position as shown in FIG. 16, switch lever 24 is allowed to rotate in the anti-clockwise direction by detention lever 23 by means of control lever 22 so as to turn main switch $S_3$ to the opened position. Thereby, exposure time control circuit C is rendered inoperative to prevent unnecessary current flow to that circuit.

Figure 17:
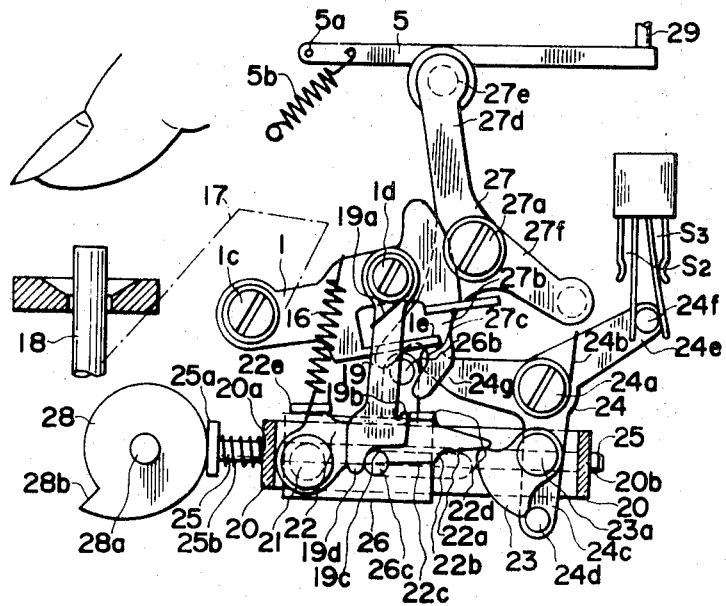
FIG. 17 shows the position of the elements of FIG. 11 wherein the pressure on the shutter release button is removed prior to the termination of exposure.

In case the object to be photographed is dark and the time of exposure is relatively long, even after the pressure exerted on release button 18 is removed prior to the termination of exposure as shown in FIG. 17, pin 26b still retains the movable mirror in the photographing position by means of mirror lever 27 and lock lever 25 which has been slid to the leftward position at this stage. Furthermore, pin 26c is in engagement with forward end 19c to arrest the movement of lever 19 and bottom base end 22c is in engagement with slot 26d. Hence the rotation of switch lever 24 in the anti-clockwise direction is prevented. Thus, main switch $S_3$ is maintained in the closed condition, such that exposure time control circuit C remains operative until the exposure is terminated.

What is claimed is:

1. In a single lens reflex camera operable in a viewing condition and a photographing condition and comprising a light measuring circuit having a light receptive element for receiving light from an object to be photographed through an objective lens and for generating an output voltage representative of the object light intensity, means for storing said output voltage, and means for timing the closing of a shutter in accordance with said stored voltage, and a switch mechanism including a first switch for selectively connecting said means for storing and said light measuring circuit and a second switch for selectively connecting said means for timing the closing of the shutter and an electric power source, comprising:

an operating member movable between a first position and a second position respectively representing said viewing condition and said photographing condition;

an interlocking member interlocking with said operating member and movable between a first position for restraining said operating member in said first position and a second position for allowing said operating member to move to said second position thereof and being retained in said second position when said operating member is located in said second position thereof;

means responsive to shutter releasing operation to move from a first position thereof to a second position thereof;

means for interconnecting said means responsive to shutter release operation with said interlocking member for moving the latter from said first position to said second position thereof with the movement of the former from said first position to said second position thereof;

means for actuating said first switch to electrically isolate said means for storing from said light measuring circuit and said second switch to electrically connect said means for timing the closing of said shutter to said electric power source with said interlocking member moving from said first position to said second position thereof;

means for releasing the interconnection between said means responsive to shutter releasing operation and said interlocking member when said operating member is located in said second position; and means for positioning said operating member in said first position in response to the termination of exposure.

2. A single lens reflex camera as in claim 1, wherein said first switch connects said means for storing to said light measuring circuit and said second switch isolates said means for timing the closing of the shutter from said electric power source when said interlocking member is located in said first position thereof.

3. A single lens reflex camera as in claim 1, wherein said operating member includes a rod slidable relative to the camera body from a first position to a second position and is biased to said second position by a spring, a cam plate rotatable together with a member for terminating exposure, and a member for engaging with said cam plate.

4. A single lens reflex camera as in claim 3, wherein said rod includes a projection having a slot, said interlocking member is composed of a lever supported rotatably by a pin on the camera body and provided with first and second edges for engaging with said slot through a step for restraining said operating member in said first position thereof, and said interlocking member is positioned in said first position thereof when said first edge engages with said slot and positioned in said second position thereof when said second edge engages with said slot.

5. A single lens reflex camera as in claim 1, wherein said means for timing the closing of a shutter in accordance with said stored voltage includes a switching circuit and electromagnetic means for triggering a closing member of the shutter to terminate exposure in response to the actuation of said switching circuit, and said second switch isolates said electromagnetic means from said electric power source with the movement of said interlocking member from said second position to said first position thereof.

6. In a single lens reflex camera operable in a viewing condition and a photographing condition and comprising a light measuring circuit having a light receptive element for receiving light from an object to be photographed through an objective lens and for generating an output voltage representative of the object light intensity, means for storing said output voltage, and means for timing the closing of a shutter in accordance with said stored voltage, and a switch mechanism including a switch for selectively connecting said means for storing and said light measuring circuit, comprising:

an operating member movable between a first position and a second position respectively representing said viewing condition and said photographing position;

means for retaining said operating member in said first position;

means movable from a first position to a second position for releasing the retainment of said operating member in response to shutter releasing operation;

means following said movable means for actuating said switch to electrically isolate said means for storing from said light measuring circuit with said movable means moving from said first position to said second position;

said means for retaining said movable means and said following means actuating said switch prior to the releasing of said operating member; and means for restraining said following means in the position for actuating said switch.

7. A single lens reflex camera as in claim 6, wherein said following means is interconnected with said means for retaining to move therewith, and said means for retaining is movable between a first position for retaining said operating member in said first position thereof and a second position for allowing said operating member to move to said second position and is interlocked with said movable means to move therewith when the latter moves from the first position to the second position thereof, and further comprising means for restraining said means for retaining in said second position thereof with said operating member in said second position thereof, and means for disconnecting said means for retaining from said following means so that said means for retaining may return regardless of said movable means when said operating member returns from said second position thereof.

8. A single lens reflex camera as in claim 6, further comprising means for preventing said movable means from returning to said first position thereof when said operating member is in said first position thereof.

9. A single lens reflex camera as in claim 8, wherein said means for retaining retains said operating member in their respective first positions and vice versa in their respective second positions, and the operating member includes said means for disconnecting said means for retaining from said following means.

10. In a single lens reflex camera operable in a viewing condition and a photographing condition and comprising a light measuring circuit having a light receptive element for receiving light from an object to be photographed through an objective lens and for generating an output voltage representative of the object light intensity, means for storing said output voltage, and means for timing the closing of a shutter in accordance with said stored voltage, and a switch mechanism including a switch for selectively connecting said means for storing and said light measuring circuit, comprising:

an operating member movable between a first position and a second position respectively representing said viewing condition and said photographing position;

means movable between a first position for retaining said operating member in said first position and a second position for allowing said operating member to move to said second position;

means responsive to shutter releasing operation to bring said movable means from said first to said second position thereof to release the retainment of said operating member;

means for restraining said movable means in said second position thereof with said operating member in said second position thereof;

means for releasing said means for restraining with said operating member returning from said second position;

means for disconnecting said movable means from said responsive means so that said movable means may return regardless of said responsive means when said operating member returns from said second position thereof; and means for actuating said switch to electrically isolate said means for storing from said light measuring circuit with said movable means moving from said first position to said second position, said movable means and said means for actuating operating said switch prior to the releasing of said operating member.

11. A single lens reflex camera as in claim 10, wherein said means for actuating said switch is a member interlocked with said movable means to move therewith.

12. A single lens reflex camera as in claim 11, wherein said movable means retains said operating member in their respective first positions and vice versa in their respective second positions, and said operating member includes said means for disconnecting said movable means from said responsive means.

* * * * *